United States Patent [19]

Hemming

[11] 3,886,324

[45] May 27, 1975

[54] ADAPTABLE MOUNTING FOR ALTERNATIVE FORMS OF TELEPHONE DIALS

[75] Inventor: Raymond Charles Hemming, London, Ontario, Canada

[73] Assignee: Northern Electric Company Limited, Montreal, Quebec, Canada

[22] Filed: July 17, 1974

[21] Appl. No.: 489,240

[52] U.S. Cl. .............................. 179/178; 179/100 R
[51] Int. Cl. .............................................. H04m 1/02
[58] Field of Search ............ 179/100 R, 100 D, 178, 179/179, 100 C

[56] References Cited

UNITED STATES PATENTS

| | | | |
|---|---|---|---|
| 2,726,292 | 12/1955 | Sargisson et al. | 179/178 |
| 2,862,063 | 11/1958 | Wood | 179/100 D |
| 3,126,454 | 3/1964 | Fresk et al. | 179/178 |
| 3,838,232 | 9/1974 | Laing et al. | 179/178 |
| 3,839,605 | 10/1974 | Morrell et al. | 179/178 |

*Primary Examiner*—Kathleen H. Claffy
*Assistant Examiner*—Randall P. Myers
*Attorney, Agent, or Firm*—Sidney T. Jelly

[57] ABSTRACT

An adaptable mounting for alternative forms of telephone dials comprises a mounting bracket which can be attached to a telephone housing base in either of two alternative positions. In one position a spacer is positioned between the bracket and housing base to raise the bracket. Adaptors are provided for attaching to the top ends of the bracket cover to accept one form of dial, an alternative form of dial being mounted directly on the bracket cover.

4 Claims, 13 Drawing Figures

ADAPTABLE MOUNTING FOR ALTERNATIVE FORMS OF TELEPHONE DIALS

This invention relates to adaptable mountings for alternative forms of telephone dials, and in particular for mounting alternative forms of dials using a common mounting bracket. A particular feature of the invention is the ability to adapt a telephone set to an alternative form of dial using the existing mounting bracket.

Generally, telephone sets have two alternative forms of dial—a rotary dial and a pushbutton dial. The remainder of the telephone set can be universal, but presently, telephone sets in two fully assembled forms are stocked. If a user has one form of telephone, and wishes to change, then an alternative form is provided. Each dial has its own specific form of mounting and dials cannot be changed without changing all the support structures.

The present invention provides alternative mountings for dials in which a common mounting bracket is used, and in combination with either a spacer member for one form of dial or adaptors for attachment to the bracket for the other form.

The invention will readily understood by the following description in conjunction with the accompanying drawings in which.

Figure 1:
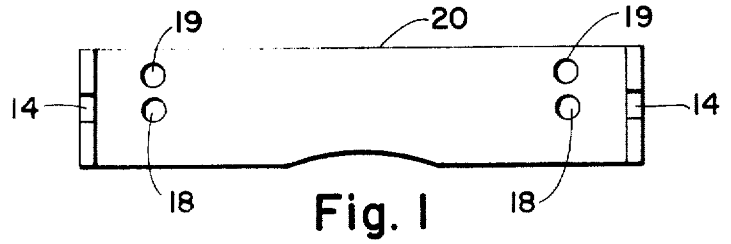
FIG. 1 is a plan view of a mounting bracket.
Figure 2:
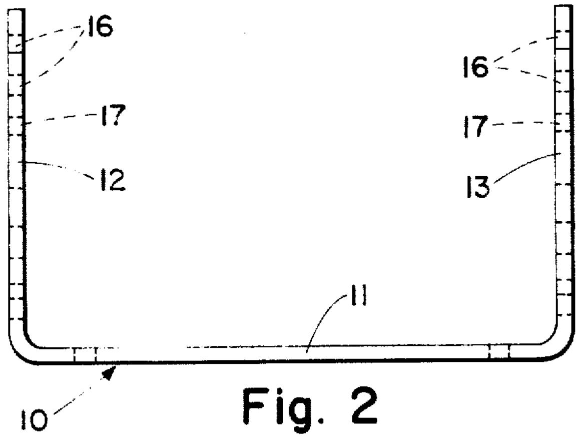
FIG. 2 is a side view of the bracket of FIG. 1.
Figure 3:
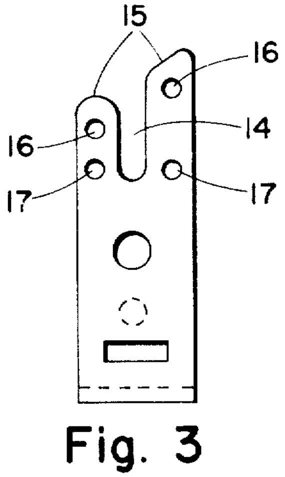
FIG. 3 is an end view of the bracket of FIG. 1.

The bracket 10, illustrated in FIGS. 1, 2 and 3, is of a U shape, having a flat base web 11 and two spaced apart upstanding webs or legs 12 and 13, for convenience referred to as the left leg 12 and right leg 13. At the top of each leg 12, 13, is a slot 14 extending downwardly a short distance. The top edge 15 of each leg is inclined, being inclined forwardly and downwardly when installed in a telephone set and viewed from the front. Each leg is provided with a pair of holes, 16 having their centres on a line parallel to the inclined top edge 15. A further pair of holes 17 may be provided, in the present example at the level of the bottom of the slot 14. The base web 11 also has two pairs of holes for attaching the bracket to the telephone base plate. One pair 18 is on the centre-line of the base web 11 and the other pair 19 is set approximately halfway between the pair 18 and back edge 20 of the base web.

The two pair of holes 18 and 19 permit two positions for attaching the bracket 10. In the present example, as will be described later, when using the pair of holes 18 the bracket is positioned directly on the base plate of the telephone. When using the pair of holes 19, a spacer is positioned between the base web 11 and the base plate.

Figure 4:
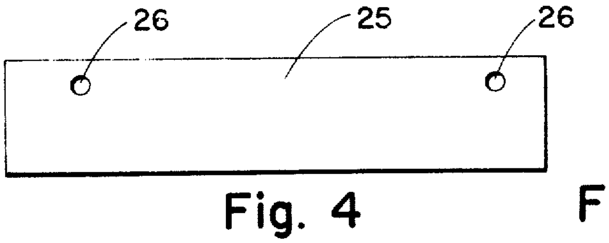
FIG. 4 is a plan view of a spacer.
Figure 5:
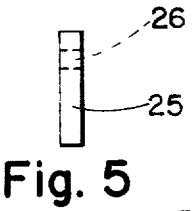
FIG. 5 is an end view of the spacer of FIG. 4.

FIGS. 4 and 5 illustrate a typical spacer 25. It has a rectangular plan form, conveniently formed from thin flat bar or thick sheet. It can be of metal or other material. With a suitable material it could be molded. The spacer is substantially of the same shape and size as the base web 11 of the bracket. It has one pair of holes 26 which, when the spacer is in position below the bracket, align with the pair of holes 19 in the base web 11.

By means of the two pairs of holes 18 and 19 in the base web 11 of the bracket 10, together with the spacer 25, the bracket can be mounted in either of two alternative positions: either in what can be called a first position, with the base web directly on the base plate and using the holes 18, conveniently considered as the downward and rearward position, or in a second position using holes 19 and spacer 25, considered as the upward and forward position.

Figure 6:
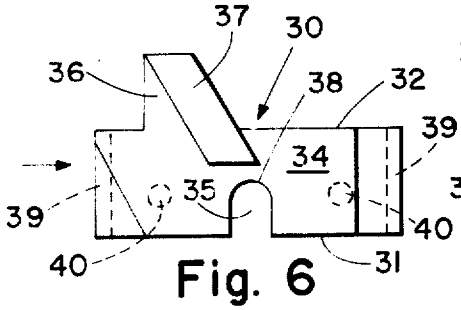
FIGS. 6, 7 and 8 are side, end and plan views respectively of one of a pair of adaptors.
Figure 7:
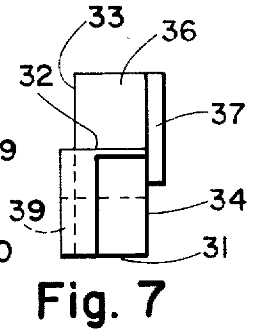
Figure 8:
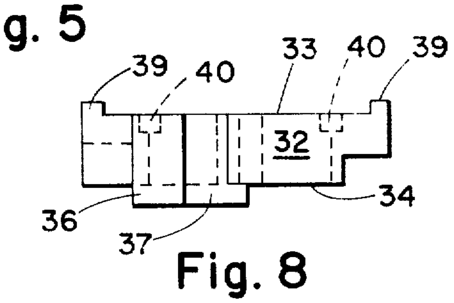

The position of the top end of each leg 12, 13 of the bracket 10 will of course vary depending upon the mounting position of the bracket 10. This is the first step towards providing the two alternative mounting positions for the alternative forms of dial. To provide for differing forms of dial attachment, adaptors are provided for attachment to the top ends of the legs of the bracket 10. These adaptors are illustrated in FIGS. 6 to 11. The adaptors are essentially a handed pair—and in general are identical in form but of opposite hand. The adaptor for the left hand leg is illustrated in FIGS. 6, 7 and 8, the adaptor generally indicated at 30.

Conveniently the adaptor is molded, and is generally of rectangular form with a base surface 31, a top surface 32, an inner face 33 and outer face 34. A slot 35 extends upwardly from the base surface 31, approximately midway along the length of the adaptor, extending approximately half way through the adaptor from the base surface. An extension 36 projects from the top surface 32 and the extension has an inclined projecting rib 37. Rib 37 projects from the outer face 34, as seen in FIGS. 7 and 8, and the axis of the rib intercepts the axis of the semi-circular end 38 of the slot 35. The rib 37 is a close sliding fit in the slot 14 in the top end of leg 12 of bracket 10. Two narrow ribs 39 project from the ends of the inner face 33 and, in use fit on the edges of a mounting bracket attached to a dial. Two small recesses 40 are formed in the inner face 33 for the reception of small protrusions on the dial bracket. The screw for attaching the dial bracket passes through the slot 35.

Figure 9:
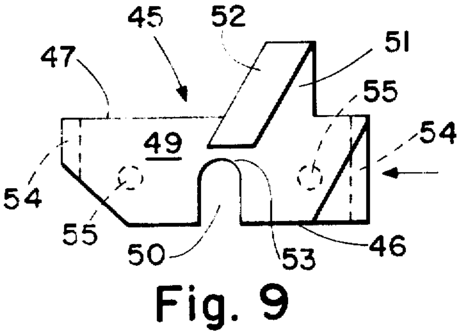
FIGS. 9, 10 and 11 are side, end and plan views respectively of the other of a pair of adaptors.
Figure 10:
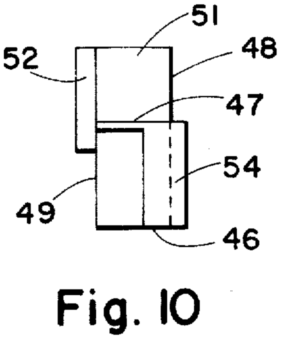
Figure 11:
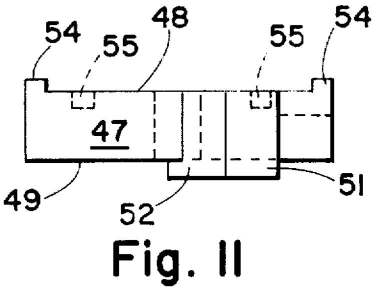

The adaptor for the right leg 13 of the bracket 10 is illustrated in FIGS. 9, 10 and 11, and is indicated generally at 45. As stated previously, the adaptor 45 is the opposite hand to that of adaptor 30, but otherwise is substantially the same in general form. It has a base surface 46, top surface 47, inner face 48, and outer face 49. A slot 50 extends upwardly from the base surface 46, there is an extension 51 on the top surface 47, and a projecting rib 52, which is a sliding fit in the slot 14 in the top end of leg 13 of the bracket 10. The axis of rib 52 intercepts the axis of the semicircular end 53 of the slot 50. Two narrow ribs 54 project from the ends of the inner face 48, and two small recesses 55 are formed in the inner face 48.

Figure 12:
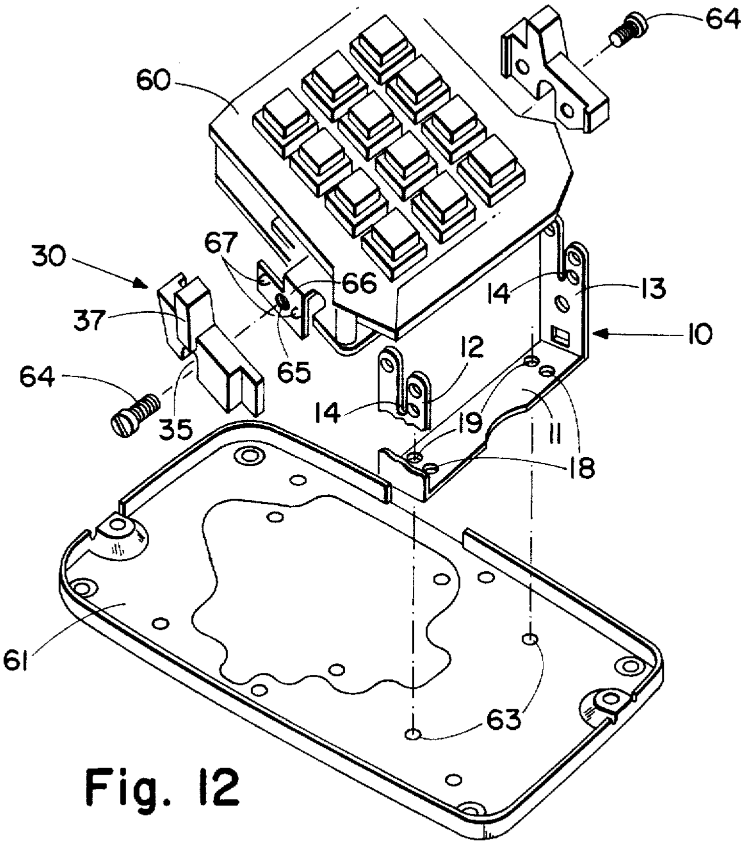
FIGS. 12 and 13 illustrate by perspective exploded views, the two alternative mountings.

The adaptors 30 and 45 are used when the bracket 10 is in the downward and rearward position, as illustrated in FIG. 12, which is the position for mounting the pushbutton dial—indicated at 60. In FIG. 12 are shown the base plate 61 of a telephone set and the relative positions of the bracket 10, adaptors 30 and 45 and the dial 60. The bracket 10 is attached to the base plate 61 by screws 62 passing through holes 63 in the base plate and through the pair of holes 18 in the bracket. The adaptors slide into position on the bracket 10, with the ribs 37 and 52 in the slots 14. The adaptors are attached to the dial 60, by screws 64 passing through the slots 35 and 50 in the adaptors and screwing into the threaded holes 65 in the mounting brackets 66 in the dial. Two protrusions 67 on each mounting bracket 66 enter the recesses 40 and 55 in the adaptors.

Figure 13:
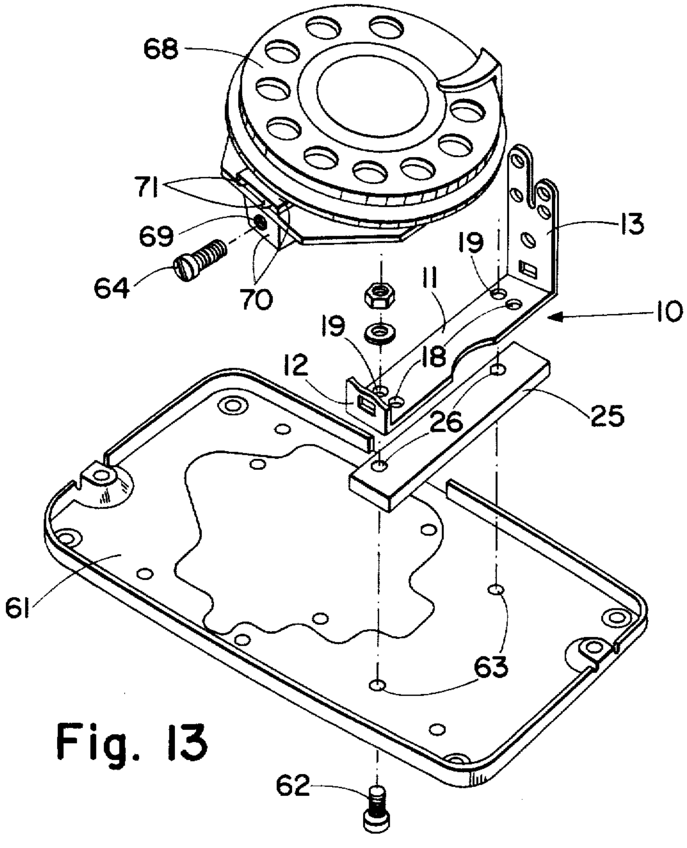

For mounting a rotary dial 68, as illustrated in FIG. 13, the bracket is mounted in the upward and forward position. The spacer 25 is positioned between the base web 11 of the bracket 10 and the base plate 61. The screws 62 pass through the holes 63 in the base plate, the holes 26 in the spacer and the holes 19 in the base web 11. No adaptors are used, the screws 64 passing through the slots 14 in the legs 12 and 13 of the bracket 10 and into threaded holes 69 in brackets 70 attached to the dial 68. Two protrusions 71 on each bracket 70 enter the holes 16 at the top of each leg of the bracket.

The further pair of holes 17 in each leg of the bracket 10 can be used for mounting an indicator lamp—not shown—such as may be provided in a hotel or similar situation to indicate that a message is waiting. However this is a convenience only and the holes 17 can be omitted. However holes 17 do permit of the mounting of an additional feature, such as an indicator lamp, without a further bracket attached to the base plate.

The invention provides for rapid, easy mounting of either form of dial, and one form of dial can readily be replaced by an alternate form of dial when desired. The only extra parts required are the pair of adaptors and the spacer. The thickness of the spacer is that necessary to position the dial face of the rotary dial at the desired level relative to the housing of the telephone set.

What is claimed is:

1. An adaptable mounting for alternative forms of dials in telephone sets, comprising:

a bracket for attachment to a base plate and the telephone set, said bracket including a base web and two upstanding spaced apart legs, a slot extending downwardly from a top edge of each leg and a pair of holes adjacent said top edge in each leg, a hole each side of each slot, said holes adapted to receive protrusions on mounting brackets attached to a first form of dial, each slot adapted to receive a screw for attaching said first form of dial, and two pairs of holes in said base web, a first pair in a forward position and a second pair in a rearward position;

means for attaching said bracket to said base plate by one of said two pairs of holes;

a spacer for positioning between said base plate and said base web and having a pair of holes for alignment with said second pair of holes in said base web for mounting said first form of dial;

adaptors for positioning on said bracket, an adaptor on each leg; each adaptor including a rib slideable in said slot in said leg, a further slot extending through the adaptor and a pair of recesses in an inner face, said slot further slot adapted to receive a screw for attaching a second form of dial, said recesses adapted to receive protrusions on said mounting bracket of said second form of dial.

2. A mounting as claimed in claim 1, said first form of dial a rotary dial, said second form of dial a pushbutton dial.

3. A mounting as claimed in claim 1, each of said legs having a top edge inclined forwardly and downwardly as attached to said base plate, the centres of said pair of holes in each leg on a plane parallel to said top edge.

4. A mounting as claimed in claim 3, each of said adaptors of rectangular form said rib at an angle to the longitudinal axis of said adaptor, the arrangement such that when the adaptor is mounted on said leg of said bracket, the longitudinal axis of said adaptor is parallel to said inclined top edge of said leg, said adaptors forming a handed pair.

* * * * *